United States Patent [19]

Shaw

[11] Patent Number: 5,900,382
[45] Date of Patent: May 4, 1999

[54] REFACTORY BINDER

[76] Inventor: Richard Dudley Shaw, Dunedin, High Elms Road, Downe, United Kingdom, BR6 7JN

[21] Appl. No.: 08/909,103

[22] Filed: Aug. 12, 1997

[30] Foreign Application Priority Data

Aug. 13, 1996 [GB] United Kingdom .................. 9617010

[51] Int. Cl.$^6$ ............................ C04B 28/34; C04B 35/04
[52] U.S. Cl. .......................... 501/133; 501/111; 501/107; 501/118; 501/119; 501/128; 501/105; 501/153; 501/154; 501/121; 501/122; 106/691
[58] Field of Search ..................... 106/690, 691; 501/94, 107, 111, 118, 119, 121, 122, 128, 133, 153, 154

[56] References Cited

U.S. PATENT DOCUMENTS

| | | |
|---|---|---|
| 3,904,427 | 9/1975 | Hawthorne .............................. 501/95.1 |
| 4,069,057 | 1/1978 | Kamei et al. ............................ 501/133 |
| 4,212,680 | 7/1980 | Schulz ..................................... 501/133 |
| 5,382,289 | 1/1995 | Bambauer et al. ..................... 106/690 |
| 5,478,786 | 12/1995 | Shaw ...................................... 106/690 |

*Primary Examiner*—Michael Marcheschi
*Attorney, Agent, or Firm*—Nixon & Vanderhye

[57] ABSTRACT

The present invention relates to a refractory binder that comprises a mixture of aqueous phosphate and silica sol. The silica sol has been found to gel and set in a surprisingly effective and useful way. Preferably, the refractory binder further incorporates a small amount of magnesia as an accelerator. The present invention also provides a method of binding a refractory material such, for example, as alumina, zirconia mullite or aluminium silicate by using a refractory binder according to the invention.

16 Claims, No Drawings ns
REFACTORY BINDER

FIELD OF THE INVENTION

The present invention relates to a refractory binder. The present invention also embraces a method of binding refractory material using the binder of the present invention.

BACKGROUND OF THE INVENTION

The use of ethyl silicate as a foundry or refractory binder becomes less attractive with time, on the grounds of cost and the increasing difficulty of meeting the health and safety requirements imposed upon its use.

A candidate for an alternative is a silica sol which is water based as opposed to alcohol based. Silica sol is a colloidal suspension, typically slightly alkali, p.H. c. 7.8, of amorphous silica particles in water. By various expedients known in the refractory art it can be converted to a hydrated silica gel which can be induced to set into a green shape. Indeed silica sol is used extensively in the foundry industry particularly in lost wax shell processes of precision casting. However, this relies upon a removal and drying out of water in order to achieve a green strength. This takes some time and is not amenable to proprietary processes such as the "Shaw Process" and the "Zirconal Process" which call for a fast controllable setting time of a "green" molding or refractory. Silica sols can indeed set under certain conditions but the green strength is low until some drying has taken place.

Phosphates are well recognised also as good refractory binders. The best known being acidic such as aluminium phosphate or indeed phosphoric acid. This acidity imposes limitations on their use especially in precision pieces or basic refractories. The use of neutral ammonium phosphates has been proposed, and I have a European patent on this, EP-B-0501662. The chemical sequence in the patent is:

Polyammonium phosphate+reactive basic magnesium refractory→magnesium phosphate gel+$NH_3$, and then on heating magnesium phosphate+alumina→aluminium/magnesium spinel+"$P_2O_5$".

By "$P_2O_5$" here is meant phosphate generally, and not necessarily phosphorus pentoxide. The stoichiometric content of materials disclosed herein is calculated on the basis of units of "$P_2O_5$" for simplicity.

BRIEF DESCRIPTION OF THE INVENTION

According to the present invention there is provided a refractory binder comprising a mixture of silica sol and an aqueous phosphate.

In a different aspect, the invention comprehends a method of binding a refractory material comprising mixing said refractory material with a refractory binder in accordance with the present invention, and thereafter allowing said refractory binder to gel, so as to form a green shape. Preferably the quantity of binder used is 50 to 150, desirably 60 to 80 mls per kilogram of refractory material.

I have discovered that in a mixed binder based on a phosphate and a silica sol, the silica sol gels and sets in a surprisingly effective and useful way. Preferably the phosphate is polyammonium phosphate, and for reasons which will appear hereinafter, I particularly prefer to use the neutral polyammonium phosphate/magnesia system referred to above.

Under the appropriate conditions other phosphates can be used—acid in nature. It may be necessary to acidify the silica sol and the resultant solution may be limited in its stability. Nonetheless on an occasion when the evolution of ammonia is undesirable, an aluminium orthophosphate or phosphoric acid or magnesium phosphate, or indeed a mixture of several such phosphates, may be used as the source of gelling phosphate.

It can be demonstrated that certain sodium phosphates, potassium phosphates and insoluble phosphates can be used, but for the most part they generate many undesirable low melting point compounds detrimental to refractory properties.

A further possibility to the invention is to use a solid component for either the phosphate or the silica. That is to say, for example, mono-ammonium phosphate crystalline powder or di-ammonium phosphate or polyammonium phosphate mixed into the ceramic mixture and then the silica of the systems is provided by silica sol, or alternatively polyammonium phosphate liquid and silica fume premixed into the ceramic. There are cases where these procedures are appropriate.

The ratio of polyammonium phosphate to silica sol can be varied over a substantial range of mixtures, for example 1 phosphate to 20 sol v/v to 1 to 1 v/v, even phosphate rich up to 3 vols. of phosphate. Typical ratios for use are between 1:3 and 1:2 v/v for versatility in either refractories or foundry applications, although it has been found that the optimum (faster setting time) may be achieved at a ratio of 1 part phosphate to 8 parts of silica sol by volume. Preferably the silica sol contains 10 to 15% wt $SiO_2$.

In accordance with the invention an ammonium phosphate in the presence of silica sol may cause the silica sol to gel. The phosphate may also gel to provide, in effect, a hybrid or co-gel. The polyammonium phosphates of my system are referred to as P8 and I will use this nomenclature. Indeed surprisingly the strength of the gel and the rate of increase in strength are superior to any previously cited examples discovered in the literature. An addition of 10% vol. P8 to silica sol will cause a gel in 25 minutes.

With aluminium silicate refractories the presence of magnesia is considered undesirable since low melting point compounds of magnesium silicate are formed. However, commercially many refractories and ceramics contain modest quantities of magnesia in aluminium silicates and silica in basic refractories without undue detriment to the properties. In the present invention the magnesia and alumina silicate may coexist effectively as will appear below.

For faster setting, an addition of magnesia will result in the formation of an intermediate gel of magnesium phosphate. Light magnesia or magnesium hydroxide at an addition of less than 0.5% wt of refractory or ceramic mixtures can gel the bonds very quickly. Typically a gel will form in 7–10 minutes at 0.1% or less depending upon the particle size of the magnesia. Thus in an alumina silicate one is considering the addition of normally 0.1% to say 0.5% of magnesia which is negligible for many applications.

A preferred mixture would be 1 volume P8 to 2 volumes silica sol 40% wt. The solution would contain 12% wt "$P_2O_5$" (26% wt sol). Magnesia is added to the solution or the refractory dry mixture, and a reactive alumina would be added to convert the silica sol to mullite and the magnesium phosphate to spinel upon firing. For example, the above solution could be used at 80 mls per kilo of ceramic (a fairly typical quantity of approximately 10% wt liquid and being 5.6% $H_2O$). Thus, 1.2% "$P_2O_5$" would require about 2.4% $Al_2O_3$; and 2.6% $SiO_2$ sol would require about 5.2% $Al_2O_3$; i.e. making a total of about 7.6% $Al_2O_3$ in reactive and free form to encourage the compound formation upon firing.

Clearly a 30% wt sol could be used, or a 50% wt sol. Typically a 50% wt sol requires a particle size of 25 to 30$\mu$ to remain stable in solution as opposed to a 40% wt sol that may require a 20$\mu$ particle size, or a 30% wt sol at 10 to 15$\mu$. In a sense the bigger the particle the less time it will take to gel, despite the fact that as a sol on its own the solution is more stable.

Similarly the polyammonium phosphate P8 is more stable than mono- or di-ammonium phosphate and thus the simpler phosphates give faster setting for less MgO. However, the dilution effect may be counter productive. The preferred ammonium phosphate is thus P8.

Thus having achieved fast controlled green set the refractory piece is held together initially by a small % of magnesium phosphate and partially gelled silica sol. With drying, the silica sol becomes increasingly significant until upon firing at 850°–1050° C. it is the predominant bond in the ceramic.

DETAILED DESCRIPTION OF THE INVENTION

Following is a description by way of example only of methods of performing the present invention.

EXAMPLE 1

A mixture of 1 volume Clinochem P8 at 50% wt polyammonium phosphate (36% "$P_2O_5$") is mixed with 4 volumes of 40% wt silica sol, the mixture is then mixed with tabular alumina grains and powders such as are readily known to users and manufacturers of ceramics at between 60 mls per kilogram to 80 mls per kilo, (depending upon the application) and then placed in a mold. At normal working temperatures, 150°–21° C., gelation occurs in approximately 30 minutes and can be removed within one hour. No accelerator in the form of a finely divided grain is used in this example; it appears that the silica sol causes the phosphate to gel as well as vice versa.

EXAMPLE 2

The same mixture, if $Mg(OH)_2$ is added at 0.1% wt, will set in approximately 10 minutes, and at 0.2% wt $Mg(OH)_2$ will set in approximately 5 minutes, depending upon temperature.

EXAMPLE 3

A lightly calcined MgO—for example LYCAL—if added at 0.25% wt will cause a set in 7 minutes and at 0.5% wt will cause a set in approximately 3 minutes. Longer setting times can be achieved by reducing the MgO but naturally not beyond the 30 minutes cited in Example 1.

The accelerated gelation of the system using MgO cited in Example 3 is achieved with the very modest addition of 0.25% wt LYCAL. In order to disperse this satisfactorily and quickly it can be mixed first with water to a thin milk of magnesia cream and added with the binder at the point of mixing. Greater reactivity and faster setting may be achieved by addition of light magnesia or magnesium hydroxide.

EXAMPLE 4

To a mixture of zirconia mullite blended to give generally good packing density is added:
  a solution of 1 volume P8
    3 volumes of 40% wt silica sol gelled using 0.25% wt calcined –200 mesh magnesia to total zirconia mullite body.

The mixture of solid to liquid being 1kg of refractory mixture to 65 mls of liquid total.

This mixture when thoroughly blended then vibration cast in standard bricks gave typically the following result after firing to 1450° C.

% Porosity 19.9

BD gm/cc 2.97

Modulus of R 11.89

Cold Crush 70.2

EXAMPLE 5

To a mixture as Example 4 is added:

1 volume P61 (a solution of sodium phosphate 40% wt)

3 volumes of silica sol 40 gelled in approximately 15 minutes and was stripped in 40 minutes using 65 mls per kilo of liquid per kilo of refractory.

EXAMPLE 6

To a mixture of zirconia mullite as per Example 4 is added:

1 volume $H_2O$ 2 volume silica sol 40

1 volume P8

This provides a 20% wt silica solution.

EXAMPLE 7

To a mixture of zirconia mullite as per Example 4 is added:

1 volume $H_2O$ 2 volumes silica sol 1 volume P61

EXAMPLE 8

Example 4 was repeated, but before adding to the refractory mix, the mixture of liquids was prepared by adding to 1 volume of 40% wt aluminium orthophosphate solution, 3 volumes of silica sol 40% wt solution and stirring vigorously.

EXAMPLE 9

To a zirconia mullite mix as described in Example 4 was added:
  silica sol 30—3 parts by volume
  P8 1 part by volume giving a 20% wt silica solution.

EXAMPLE 10

A refractory mixture suitable as a foundry Shaw mix was prepared comprising:

4 parts of wgt. –14+8 mesh Molochite—(calcined china clay)

3 parts zircon flour 1 parts calcined magnesite –200 mesh 1 part –200 mesh Malochite.

To this mix was added a solution comprising:

2 parts silica sol 30% by weight 1 part P8 at a total liquid of 120 ccs per kilogram. In addition fiber was added at 0.75% by wgt of refractory (polypropylene fibers 5 mm long×15–20 denier).

This mixture was vigorously stirred and poured into a suitable mold where it set after approximately 90 seconds.

EXAMPLE 11

Example 10 was repeated using a solution comprising:
2 volumes of silica sol
1 volume of P61.

EXAMPLE 12

Example 10 was repeated using a solution comprising:
2 volumes of silica sol 30% wt
1 volume of P67 (a mixture of sodium phosphate and potassium phosphate.
This mixture set in approximately 120 seconds.

EXAMPLE 13

Example 10 was repeated using a solution comprising:
2 volumes of silica sol 30% wt
1 volume P7 (monopotassium phosphate 30% wt solution)
Set in 3 minutes.

It has also been found, when using ammonium polyphosphates with sols, that the resultant co-gels may be used as a means of enhancing the properties of hydraulic refractory cements. Most refractory cement bodies and particularly low cement castables have additions of silica or silicon or aluminium or phosphates or a combination of these. The use of P8 and sol very conveniently provides these additions. Furthermore the use of the co-gel may provide a means of very controlled setting times and extraordinarily high green strengths.

The refractory binders of the present invention may also be employed in the manufacture of a "Shaw Process" precision casting mold.

The co-gels may be used as fast-setting cement castables, particularly cement castables having an ultra-low cement content, typically less than 5% wt alumina cement.

I claim:

1. A A silica sol based refractory binder comprising a mixture of silica sol, an aqueous phosphate and magnesia or magnesium hydroxide present in an amount up to 0.5% by weight for controlling the setting time of the binder.

2. A refractory binder as claimed in claim 1, wherein the silica sol and phosphate are present in a ratio of 20:1 to 1:3 by volume.

3. A refractory binder as claimed in claim 1, wherein the silica sol and phosphate are present in a ratio of 8:1 to 2:1 by volume.

4. A refractory binder as claimed in claim 1, wherein the binder comprises about 0.1 to 0.5% wt magnesia.

5. A refractory binder as claimed in claim 1, wherein said aqueous phosphate comprises at least one member selected from the group consisting of phosphoric acid, aluminum orthophosphate, magnesium monophosphate, mono-sodium phosphate, di-sodium phosphate, mono-potassium phosphate, di-potassium phosphate and an insoluble phosphate.

6. A refractory binder as claimed in claim 5, wherein the insoluble phosphate is dicalcium phosphate.

7. A refractory binder as claimed in claim 1, wherein said aqueous phosphate comprises polyammonium phosphate or ammonium phosphate.

8. A refractory binder as claimed in claim 1, wherein said silica sol comprises 10 to 15% wt $SiO_2$.

9. A refractory binder as claimed in claim 1, further comprising reactive alumina.

10. A refractory binder as claimed in claim 8, wherein said reactive alumina is alumina sol.

11. A method of binding a refractory material comprising the steps of:

(a) mixing said refractory material with a silica sol based refractory binder comprising a mixture of silica sol, an aqueous phosphate and magnesia or magnesium hydroxide present in an amount up to 0.5% by weight for controlling the setting time of the binder, and thereafter (b) allowing said refractory binder to gel to form a green shape.

12. A method as claimed in claim 11, wherein said refractory material is selected from alumina, aluminum silicate or zirconia mullite.

13. A method as claimed in claim 11, wherein the quantity of binder used is 50 to 150 mls per kilogram of refractory material.

14. A method as claimed in claim 13, wherein the quantity of binder used is 60 to 80 mls per kilogram of refractory material.

15. A fast setting cement comprising a silica sol based refractory binder, said binder comprises a mixture of silica sol, an aqueous phosphate and magnesia or magnesium hydroxide present in an amount up to 0.5% by weight for controlling the setting time of the binder, wherein said binder has been allowed to form a co-gel of phosphate and silica gel.

16. A fast setting cement as claimed in claim 15, further comprising a hydraulic refractory cement.

* * * * *